United States Patent [19]
Nixon et al.

[11] Patent Number: 6,128,482
[45] Date of Patent: Oct. 3, 2000

[54] PROVIDING MOBILE APPLICATION SERVICES WITH DOWNLOAD OF SPEAKER INDEPENDENT VOICE MODEL

[75] Inventors: Timothy R. Nixon, Northville; Gary A. Watkins, Royal Oak, both of Mich.

[73] Assignee: General Motors Corporation, Detroit, Mich.

[21] Appl. No.: 09/218,237

[22] Filed: Dec. 22, 1998

[51] Int. Cl.[7] .................................................. H04M 3/42
[52] U.S. Cl. .................. 455/414; 379/88.01; 379/88.04; 379/88.11; 379/354; 455/414; 455/563
[58] Field of Search ................................ 704/270, 275; 379/88.03, 88.01, 88.02, 88.04, 354; 455/563, 414, 564, 565, 570

[56] References Cited

U.S. PATENT DOCUMENTS

| | | | |
|---|---|---|---|
| 5,165,095 | 11/1992 | Borcherding | 379/88 |
| 5,764,731 | 6/1998 | Yablon | 379/88 |
| 5,864,603 | 1/1999 | Haavisto et al. | 379/88 |
| 5,878,395 | 3/1999 | Bennett | 704/275 |
| 5,890,123 | 3/1999 | Brown et al. | 704/275 |
| 5,912,949 | 3/1999 | Chan et al. | 379/88.03 |
| 5,915,239 | 6/1999 | Haavisto et al. | 704/275 |
| 5,950,166 | 9/1999 | Hab-Umbach et al. | 704/275 |
| 5,956,684 | 9/1999 | Ishii et al. | 704/275 |
| 6,049,594 | 4/2000 | Furman et al. | 379/67.1 |

*Primary Examiner*—Edward F. Urban
*Assistant Examiner*—Blane J. Jackson
*Attorney, Agent, or Firm*—Anthony Luke Simon

[57] ABSTRACT

The vehicle of a subscriber of mobile application services is provided with wireless telecommunication apparatus for communication over a wireless network and a public switched telephone network with a service center. When a subscriber calls the service center to locate a particular point of interest (POI), the service center advisor extracts data from a database and downloads it to the vehicle. The information includes a dialable telephone number and an identifying speaker independent voice model of the POI and may include POI identification and location data. The vehicle is equipped with apparatus which stores the downloaded data for automated dialing of the dialable telephone number initiated by the subscriber speaking data matching the identifying speaker independent voice model and may include apparatus to visually or audibly display the identifying, locating and/or descriptive data. The subscriber may call the service center from the vehicle or from a telephone outside the vehicle, with the download to the vehicle resulting from either call. The vehicle may be equipped to store multiple dialable telephone numbers and identifying speaker independent voice models, with identification data for each displayed so that the subscriber may cycle through them to pick one for automated dialing.

12 Claims, 6 Drawing Sheets

| Identification Data | Location Data | Telephone Number | Voice Model | Descriptive Data |
|---|---|---|---|---|
| $ID_1$ | $LD_1$ | $TN_1$ | $VM_1$ | $DD_1$ |
| $ID_2$ | $LD_2$ | $TN_2$ | $VM_2$ | $DD_2$ |
| $ID_3$ | $LD_3$ | $TN_3$ | $VM_3$ | $DD_3$ |
| $ID_n$ | $LD_n$ | $TN_n$ | $VM_n$ | $DD_n$ |

FIG. 5

PROVIDING MOBILE APPLICATION SERVICES WITH DOWNLOAD OF SPEAKER INDEPENDENT VOICE MODEL

TECHNICAL FIELD

The technical field of this invention is the provision of mobile application services to a vehicle.

BACKGROUND OF THE INVENTION

A mobile application service provider such as OnStar® provides information and services to the vehicles of subscribers from a service center through vehicle installed wireless telecommunication apparatus. One type of service provided, in response to a request from a subscriber, is the selection of a specific point of interest from a stored database and the communication to the vehicle of data associated with the specific point of interest in the database. Such associated data typically includes identification (name), location data (address) and dialable telephone number. For example, a traveling subscriber may call from an equipped vehicle and request a restaurant serving a particular kind of food, or a hotel. If the call is from the equipped vehicle, the mobile application service center silently obtains GPS or other vehicle position data from the vehicle via the telecommunication apparatus; and an advisor receives the subscriber's request, consults a stored database for the nearest points of interest meeting the subscriber's criteria, suggests possible points of interest to the subscriber, receives the subscriber's choice, verbally provides identification and location information to the subscriber and, if authorized, places a call to the selected point of interest with the dialable telephone number. The advisor may also provide the telephone number verbally to the subscriber, so that the subscriber may call the point of interest directly via the vehicle wireless telecommunication apparatus at a later time. The advisor may also, or alternatively, provide a download of the dialable telephone number to the vehicle for automated dialing by the subscriber by the press of a key at a later time.

The vehicle installed wireless telecommunication apparatus may be equipped for "hands free" operation, with a microphone and speaker audio interface and with voice recognition software preprogrammed to recognize certain commands, names and other special words that enable the subscriber to operate the telephone without using a handset. But the words to be recognized must be programmed into the vehicle apparatus in the form of voice models; and such words for new points of interest provided to the vehicle in operation cannot be easily provided in advance. If no such word is available, the subscriber placing a call to a point of interest suggested by the advisor cannot initiate "hands free" dialing of the provided number by use of a simple word or phrase, but must remember or read the telephone number from a display and speak the telephone number digit by digit. Thus the "hands free" potential of the system is not maximized. Alternatively, if the system provides for the vehicle operator to enter such a word by speaking it, such entry requires the operator to exert extra effort to either think of an appropriate word or select such a word suggested by the advisor, and then speak the word, usually several times, in a less than ideal audio environment, to "train" the system. Thus the advantages of the "hands free" potential of the system are partially frustrated.

SUMMARY OF THE INVENTION

The method and apparatus of this invention increases the subscriber's ease and convenience in recalling and dialing the telephone number of a point of interest obtained from the service center by providing the wireless telecommunication apparatus of the vehicle with data storage means for storing a received dialable telephone number and an associated identifying speaker independent voice model and further means activatable by the subscriber for automated dialing of the stored dialable telephone number in response to spoken data corresponding to the identifying speaker independent voice model. Upon selection of a point of interest, an advisor at the service center downloads the associated dialable telephone number and identifying speaker independent voice model of the chosen point of interest as data through a public switched telephone network and a connected wireless network including the vehicle wireless telecommunication apparatus to the data storage means in the vehicle. Since the identifying speaker independent voice model is speaker independent, there is no need for the subscriber to provide the identifying word or phrase and train the system to his voice and pronunciation. Thereafter, the subscriber may initiate automated dialing of the stored dialable telephone number at any time by speaking data corresponding to the identifying speaker independent voice model together with an appropriate command. The subscriber's request may be made from the wireless telecommunication apparatus of the vehicle or from a separate, outside telephone; and the service center can tell the source of the call from the originating number of the incoming call or the number dialed and treat it accordingly.

Optionally, the service center can also download identification data for display in the vehicle. This allows the vehicle to display the word or phrase represented by the identifying speaker independent voice model, either visually or audibly, for the convenience of the subscriber. Also, optionally, the data storage means is capable of storing a plurality of dialable telephone numbers with associated identifying speaker independent voice models and associated identification data, including visual display or speech generation data. The advisor may then download such data for a plurality of points of interest; and the subscriber may cycle through the stored data in the vehicle, with the identifying word or phrase displayed, visually and/or audibly, for each choice, and choose one of the identifying words or phrases to speak and thus activate automated dialing of the corresponding dialable telephone number.

DESCRIPTION OF THE PREFERRED EMBODIMENT

Figure 1:
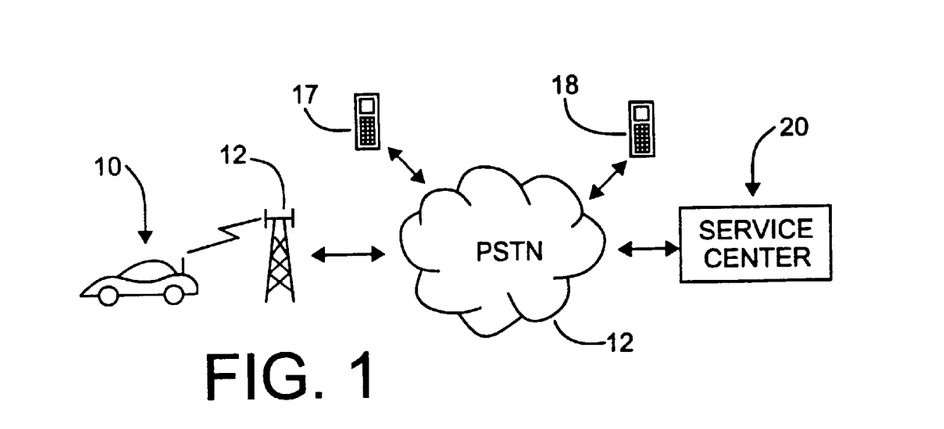
FIG. 1 shows a mobile application services network through which mobile application services are provided to a vehicle.

Referring to FIG. 1, a vehicle 10 carries mobile telecommunication apparatus, which may be installed in the vehicle or carried into the vehicle by the subscriber. This mobile telecommunication apparatus communicates through a wireless network 12, symbolized by a local telecommunication antenna tower, with a public switched telephone network (PSTN) 15, to which are also connected telephones 17 and 18. The mobile telecommunication apparatus in vehicle 10, which will be described in more detail with reference to FIG. 2, may comprise a cellular telephone registered with a cellular service provider or any other wireless apparatus, as long as it provides connection with, and operation through, PSTN 15 with general dialing capability.

The telecommunication apparatus carried in vehicle 10 is also registered with a service provider such as OnStar®, which provides mobile application services to a subscriber through the apparatus in vehicle 10. The subscriber may be the owner or lessor of vehicle 10, especially if at least part of the telecommunication apparatus is permanently installed in the vehicle; but the term "subscriber" in this description may include a renter, operator or passenger in the vehicle using the services. The service provider maintains at least one service center 20, which is also connected to PSTN 15 and which the subscriber and other subscribers in other vehicles call for the mobile application services. The mobile application services may include, for example, requests for vehicle location, selection of specific points of interest and directions thereto, and emergency assistance (both requested and automatic), as well as others not named.

Figure 2:
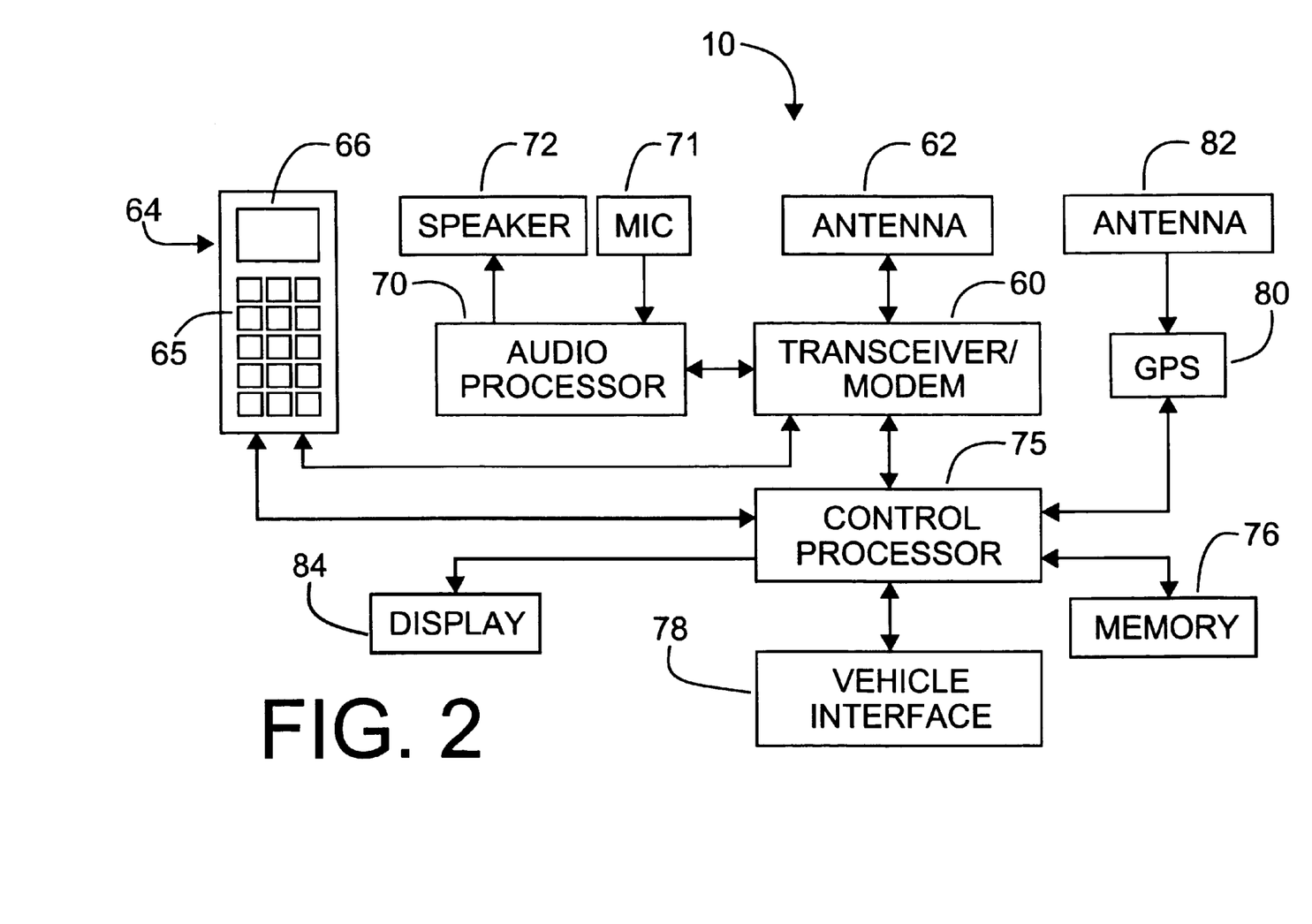
FIG. 2 shows the vehicle portion of the network of FIG. 1 in greater detail.

FIG. 2 is a block diagram of the wireless telecommunication apparatus in vehicle 10. A transceiver 60 communicates voice and data through wireless network 12 with public switched telephone network 15 through an antenna 62. In this embodiment, transceiver 60 is provided with voice communication links to a handset 64 and, through an audio processor 70, to a microphone 71 and speaker 72 for "hands-free" operation. Transceiver 60 also includes modem apparatus for data communication to and from vehicle 10. A control processor 75, which may take the form of a programmed digital computer or a custom digital processor, has a data link to transceiver 60, both for control thereof and for communicating data therewith. Control processor 75 is connected by a data link to a memory 76 and also controls and communicates with a GPS or similar navigation apparatus 80, which receives signals through a GPS antenna 82 from global positioning satellites and derives therefrom position data (e.g., the longitude and latitude and/or the speed and heading) of the apparatus. The GPS position data may, under control of control processor 75, be stored in memory 76 and provided therefrom to transceiver 60 for conversion into a transmissible form by the modem apparatus therein and subsequent transmission from vehicle 10 to service center 20.

Handset 64 of this embodiment contains operator interface apparatus for transceiver 60; a keypad 65 provides dialing capability and may include extra keys for special functions. A display 66 allows information to be conveyed visually. Handset 64 also contains a memory for holding data to be displayed in display 66 and for storing one or more dialable telephone numbers for automated dialing, and the memory is organized with a data structure associating particular data for display with a particular dialable telephone number. Handset 64 also includes apparatus for automated dialing of the held or stored dialable telephone numbers in response to a "send" key on keypad 65. Such apparatus is known and used in telephones of the prior art. In addition to the voice link to transceiver 60, which is also capable of data transmission, a serial data link is provided with control processor 75, by which the latter may control certain functions of handset 64. A vehicle interface 78 may be provided to connect control processor 75 to other vehicle systems as required.

Audio Processor 70 includes voice recognition and activation apparatus which responds to predetermined spoken data via microphone 71 to perform predetermined functions. It accesses a plurality of voice models, which may be stored internally or in memory 76. Each voice model comprises data permitting recognition of a spoken word or phrase. Audio processor 70 further includes apparatus both for comparing received spoken data with the voice models in order to recognize those words and phrases which are defined and for performing predetermined actions in response thereto. Some voice models represent commands, such as "menu," "store," "dial," "call," etc. Other voice models represent the digits required for telephone dialing: "one," "two," etc. Still other voice models represent predetermined locations or entities, such as "OnStar." As an example, the apparatus may be programmed to recognize the phrase "Call OnStar" and respond by placing a call to the OnStar service center. General dialing capability may be initiated by the word "Dial" followed by the number, digit by digit.

The voice models are stored in the apparatus when it is installed in the vehicle. These voice models are speaker independent, since they are not specifically created to match the specific voices of individual vehicle operators but may be used for all subscribers. Thus the apparatus is made capable of storing one or more additional voice models, which are received in a download from the service center via transceiver 60. These voice models represent words or phrases identifying predetermined points of interest. As an example, a voice model may represent the word "Shields," the name of a restaurant having a dialable telephone number. Once the voice model and dialable telephone number are received and stored in the apparatus, recognition by audio processor 70 of the spoken command "Call" with the spoken identifying word "Shields" will initiate dialing of the corresponding dialable telephone number. The use of speaker independent voice models allows a single voice model to be stored or created for each point of interest and downloaded to any subscriber, and further eliminates the need for the subscriber to train the vehicle apparatus to recognize the word or phrase at the time of the point of interest request.

The process may be further facilitated by additional text data for displaying the word "Shields" (for example) in display 66 or another display so that the subscriber sees precisely what word or phrase to speak in order to initiate the dialing. An optional, additional visual display for this purpose is indicated as display 84 in FIG. 2, which display may be located on the dashboard, rear view mirror or other convenient location on vehicle 10.

The apparatus is also capable of speech generation based on stored speech generation data suitable for generating pre-defined words and/or phrases over speaker 72 so as to provide audible cues or other information to the vehicle operator in "hands-free" system operation. The speech generation data may be in the form of compressed real speech, coded speech, synthetic speech, or any other speech generation process. As with the voice models used in speech recognition, some speech generation data is stored in the apparatus as supplied to the subscriber but provision is made for storage and use of additional speech generation data downloaded from service center 20 for the generation over speaker 72 of the identifying word or phrase. Thus, the use of the word "display" in this document refers in its broadest sense to audible as well as visual representations.

Figure 3:
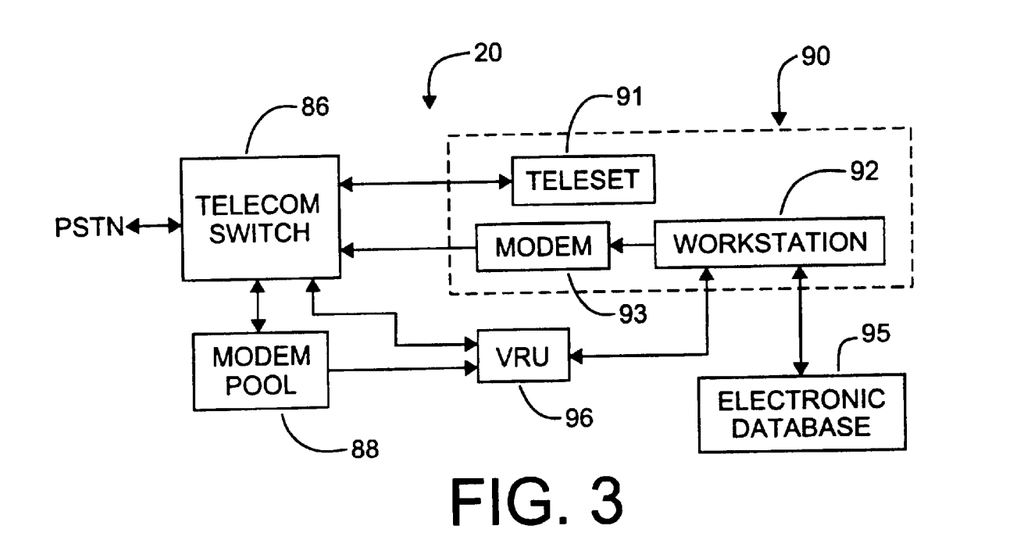
FIG. 3 shows the service center portion of the network of FIG. 1 in greater detail.

A representative block diagram of service center 20 is shown in FIG. 3. A telecom switch 86 interfaces with PSTN 15 and provides switching for incoming calls among a plurality of lines. A plurality of desktops are provided for advisors to answer the incoming calls and provide the requested services. A typical desktop 90 comprises a workstation 92 provided with a modem 93 for data communication over a data line to telecom switch 86, and further comprises a teleset 91 for voice communication by the advisor on a voice line from telecom switch 86. Workstation 92 may be a digital computer including a keyboard, a display and other typical peripherals and is provided with a data link to an electronic database apparatus 95.

Figure 5:
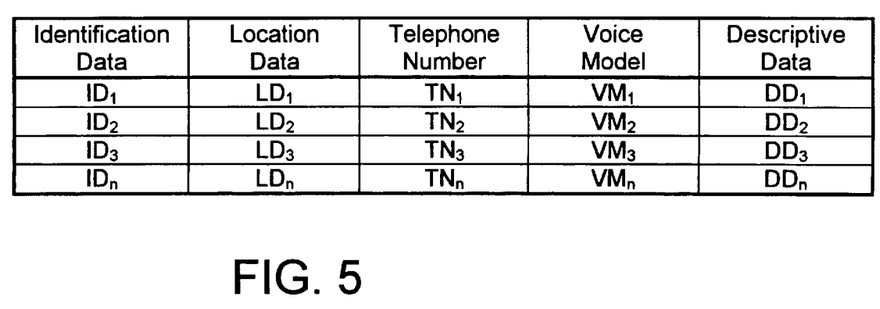
FIG. 5 shows a sample data structure in the service center database for a plurality of points of interest.

Electronic database apparatus 95 stores at least three databases of use to the advisors in providing mobile application services: (1) a subscriber database containing subscriber records, (2) a point of interest (POI) database containing records of points of interest such as restaurants, hotels, vehicle service facilities, tourist destinations and other destinations of interest to vehicle operators, and (3) a map database. The subscriber database associates with each subscriber identifying data such as name, password(s), address, etc., subscription data defining the level of subscribed services, the dialable telephone number of the embedded transceiver and, if the apparatus is permanently installed in a vehicle, vehicle data such as make, model, and VIN. The POI database associates with each point of interest identifying data including name and speaker independent voice model, location data such as street address and longitude/latitude, a dialable telephone number and optional descriptive data varying with the type of establishment. The name in the identifying data may include text for visual display and/or voice generation data for audible display (announcement). A typical data structure for the POI database is shown in FIG. 5, with "n" POI records each having fields for Identification Data, Location Data, dialable Telephone Number, identifying Speaker Independent Voice Model and Descriptive Data. Each of the shown fields may actually represent a plurality of related fields. Only the first three records and a symbolic last ("n"th) record are shown. The map database stores data for the construction and display of maps on the displays of workstations 92, upon which vehicle and other location data may be electronically overlaid.

Service center 20 further includes a modem pool 88 having a plurality of modems connected with telecom switch 86 and having an associated communications server. A voice response unit 96, connected to telecom switch 86, the communication server of modem pool 88 and the workstations 92 of desktops 90, helps manage the switching between voice and data in connection with telecom switch 86.

Figure 4A:
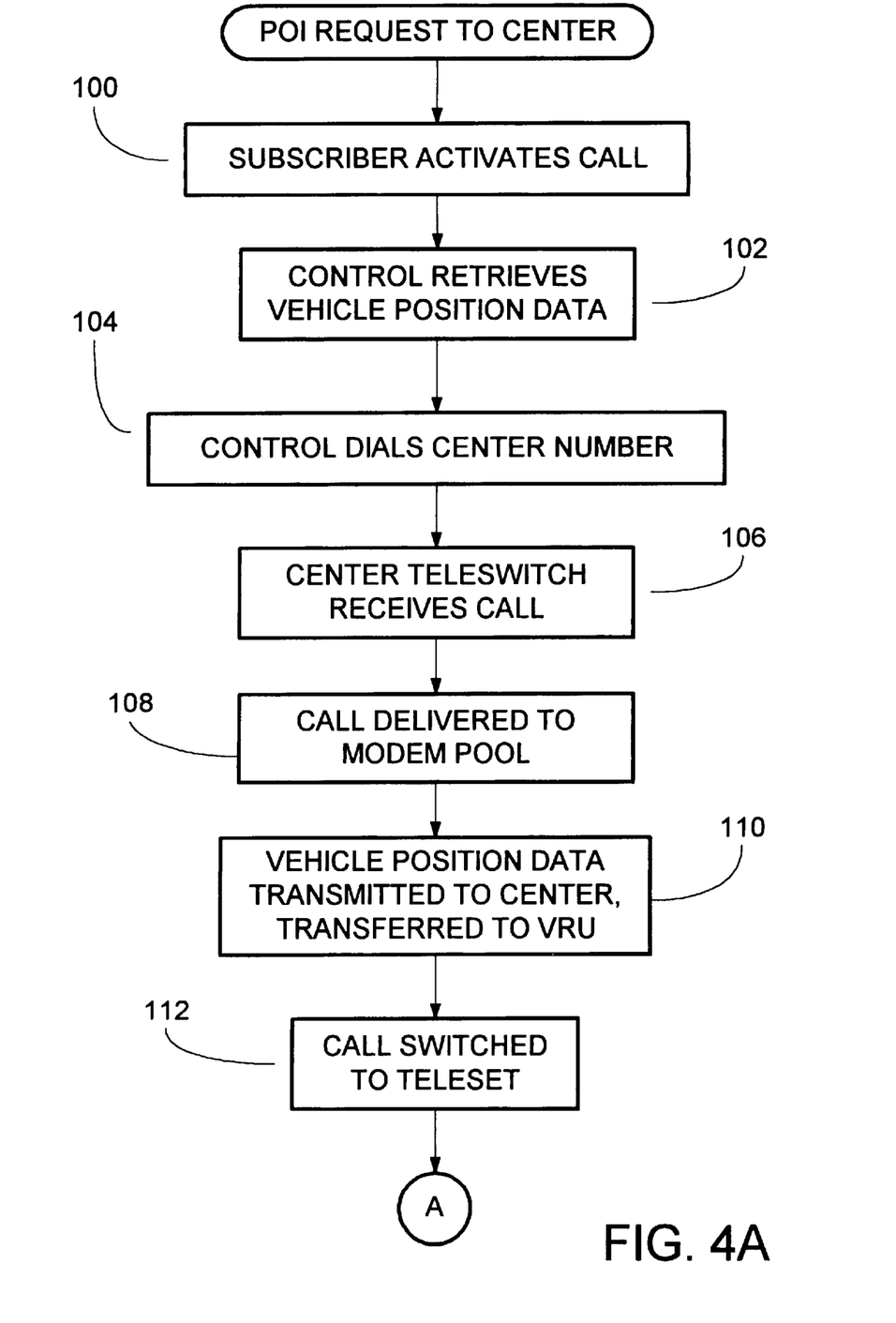
FIGS. 4A–4C show a flow chart describing the method of this invention performed in the network of FIGS. 1–3.
Figure 4B:
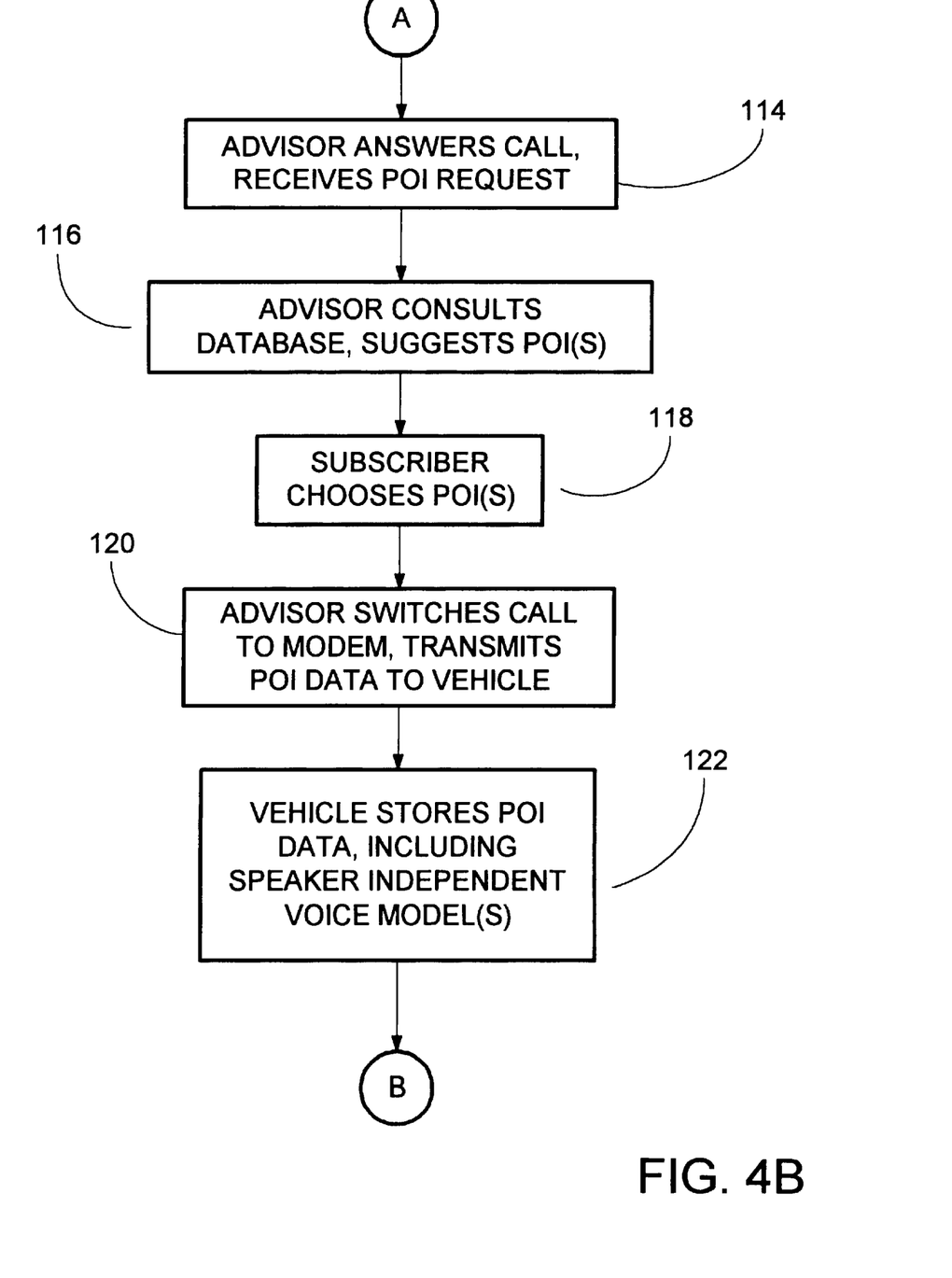

The operation of the apparatus of FIGS. 1–3 to perform the method of the invention is described with reference to the call process flow chart of FIGS. 4A–C. Referring to FIG. 4A, the process POI REQUEST TO CENTER is initiated (100) by the vehicle operator with a call to the mobile service center, for example by pressing a special key to initiate an automatic dialing of the service center number. Activation of this key first signals control processor 75 (102) to retrieve GPS position data for vehicle 10 from GPS apparatus 80 and hold it ready for transmission. Control processor 75 then causes the service center number to be dialed (104); and the call is connected (106) through PSTN 15 to the telecommunications switch of the mobile service center. The call is recognized as one from a subscriber vehicle and is thus switched (108) to the modem pool. A transmission of vehicle position data is requested by the center; and control processor 75 causes the vehicle position data to be downloaded (110) to the storage means in vehicle 10 via a data transmission through PSTN 15 and wireless network 12, with the audio volume in handset 64 and/or speaker 72 muted during the transmission. When received at the service center it is passed to the modem pool, where it is converted to electronic data and transferred through the communications server to VRU 96.

VRU 96 then signals telecom switch 86 to switch (112) the call to the teleset line of the next available advisor. Telecom switch 86 picks a teleset 91 for an audio connection between the subscriber in vehicle 10 and an advisor in service center 20. Referring to FIG. 4B, the advisor answers (114) the call and listens to the subscriber's POI request. The advisor accesses (116) electronic database 95 through workstation 92. VRU transfers the vehicle position data to workstation 92 or a server accessed thereby; and the an electronic map illustrating the vehicle position is automatically presented to the advisor on the display of workstation 92. The advisor searches the database for one or more points of interest meeting the subscriber's needs and consults with the subscriber for a selection. The POI selection is made at 118; and the advisor at 120 initiates a data transmission to the vehicle of the dialable telephone number of the chosen POI. The POI selection and data transmission may be for multiple points of interest if the apparatus of vehicle 12 is capable of storing and selecting among a plurality of dialable telephone numbers. Optionally, the advisor may also download associated identification data and/or location data of the POI; and in the case of multiple dialable numbers, identification data for visual or audible display to help in number selection will be downloaded with each dialable telephone number. From workstation 92, the data is converted in modem 93; and telecom switch 86 is signaled via VRU 96 to connect the call to the output of modem 93 for the transmission, with an initial signal over the line muting the volume in the vehicle during the transmission. In vehicle 10, the POI data is then stored at 122, with the identifying data (text and/or voice generation data), location data (e.g. address) and descriptive data available for display in the appropriate manner, the speaker independent voice model available for voice recognition, and the dialable telephone number available for automatic dialing. The call is then returned at 124 to the teleset for more services or an end of call exchange.

Figure 4C:
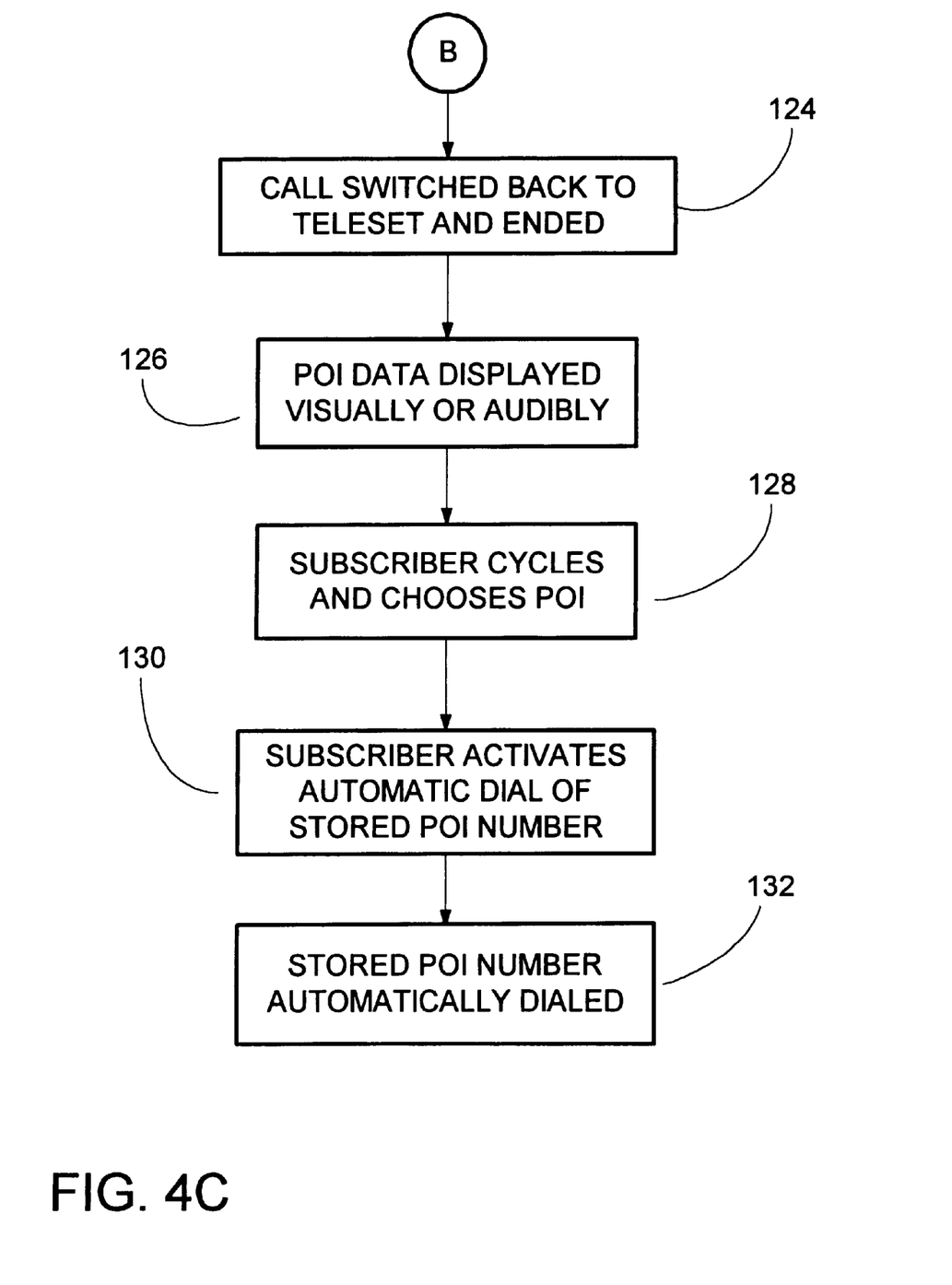

Referring to FIG. 4C, the apparatus in vehicle 10 displays (126) the identification data, if any, corresponding to a stored dialable telephone number, e.g. visually on display 66 of handset 64 or on display 84 or audibly through speaker 72. If this is one of a plurality of stored dialable telephone numbers, the subscriber may cycle (128) through the stored numbers, e. g. by activating a function key on keypad 65 of handset 64 or an equivalent function activator or by speaking a pre-defined word or phrase such as "Cycle display" until a desired point of interest is displayed visually or audibly. If only one dialable number is stored, step 128 takes a different form. In this latter case, the vehicle operator may activate the function activator or speak a predefined word or phrase such as "Display destination" to recall the point of interest with display (visual and/or audible) of the identifying data. In either case, when the subscriber wishes to call the chosen point of interest, he activates (130) a single switch—typically the "send" key of keypad 65—or speaks a pre-defined command word "Call" with the identifying word to request initiation of the call. A dialing sequence is initiated (132) automatically by control computer 75. The number is thus recalled and dialed with minimal inconvenience and effort.

In a slight variation of this process, the subscriber may initiate the process from a telephone other than the transceiver in vehicle 10, for example, telephone 17 in FIG. 1. This call is dialed to a different number in the service center, which identifies it to the service center as a non-vehicle call. Since the subscriber is not yet identified, no vehicle position data is expected; and telecom switch 86 is programmed to connect the call directly to the next available teleset 91. The advisor will require identification of the caller as a subscriber and will consult electronic database 95 for identifying data of vehicle 10. After the POI choice is made, the subscriber may request that the POI data, including the dialable number, be downloaded to vehicle 10. In order for this to be done, vehicle 10 must contact with service center 10; and it is typical in mobile application service systems such as OnStar® for the vehicle wireless telecommunication apparatus to "wake up" for communication with the service center at regular intervals to allow certain services such as remote door unlocking. The advisor may thus cause the selected POI data to be prepared for automatic transmission to vehicle 10 the next time the vehicle wireless telecommunication apparatus communicates with the service center. The subscriber may then initiate automatic dialing of the number when he enters the vehicle at a later time.

If the apparatus of vehicle 10 is equipped for multiple POI data storage, the data structure may be a subset of that shown in FIG. 5 for the service center, both in fields and records, due to limitations in storage and display capacity. In any event, for each POI the telephone number will always be stored, and some part of the identification data will normally be stored for display purposes, so that the subscriber will know what number is being called when the send key is pressed. The storage may most conveniently be on a first in, first (FIFO) out basis, so that the most recent received and stored data is available. For example, if there is storage for three dialable telephone numbers, the first three sets of data will be retained. When the fourth set is received, it will replace the first received, the fifth will replace the second, and so forth.

What is claimed is:

1. A method of providing mobile application services to a subscriber in a vehicle comprising:

providing a service center having a telecommunication apparatus connected to a public switched telephone network and an electronic database containing a data structure associating each of a plurality of points of interest with an identifying speaker independent voice model and a dialable telephone number;

providing in the vehicle a wireless telecommunication apparatus for communication over a wireless network to the public switched telephone network, the wireless telecommunication apparatus comprising a microphone, a speaker, means for receiving and storing at least one of the identifying speaker independent voice models and its associated dialable telephone number, and means responsive to spoken data matching the stored associated identifying speaker independent voice model for performing automated dialing of the stored dialable telephone number associated therewith;

in response to a subscriber request, choosing a point of interest from the electronic database and downloading the associated dialable telephone number and the associated identifying speaker independent voice model of the chosen point of interest to the data storage means in the vehicle through the public switched telephone network, the wireless network and the wireless telecommunication apparatus of the vehicle, wherein automated dialing thereof may be activated in the vehicle by the subscriber speaking data matching the associated identifying speaker independent voice model.

2. The method of claim 1 in which the data structure further associates each of the plurality of points of interest with identification data, the method further comprising:

providing the wireless telecommunication apparatus in the vehicle with means for displaying identification data stored in the data storage means;

downloading the associated identification data of the chosen point of interest along with the associated dialable telephone number and identifying speaker independent voice model to the data storage means for display by the display means.

3. The method of claim 2 in which the data storage means in the vehicle stores the associated dialable telephone numbers, associated identifying speaker independent voice models and associated identification data for a plurality of points of interest, the method further comprising:

providing means in the vehicle for cycling through the associated dialable telephone numbers and associated identifying speaker independent voice models for the plurality of points of interest while displaying the associated identification data for each point of interest in the display means and pointing to the associated dialable telephone number and associated identifying speaker independent voice model for the same point of interest for automated dialing.

4. The method of claim 2 in which the data structure further associates each of the plurality of points of interest with location data, the method further comprising:

downloading the associated location data of the chosen point of interest along with the associated dialable telephone number and associated identifying speaker independent voice model to the data storage means for display by the display means.

5. The apparatus of claim 1 in which the data structure further associates each of the plurality of points of interest with identification data, the apparatus further comprising:

means in the vehicle for displaying identification data stored in the data storage means; and means for further downloading the associated identification data of the chosen point of interest along with the associated dialable telephone number and identifying speaker independent voice model to the data storage means for display by the display means.

6. The apparatus of claim 5 in which the data storage means in the vehicle stores the associated dialable telephone number, identifying speaker independent voice model and identification data for a plurality of points of interest, the apparatus further comprising:

means for cycling through the plurality of points of interest while, for each of the points of interest, displaying the associated identification data and remaining responsive to spoken data matching the associated identifying speaker independent voice model to automatically dial the associated dialable telephone number.

7. The apparatus of claim 5 in which the data structure further associates each of the plurality of points of interest with location data, the apparatus further comprising:

means for further downloading the associated location data of the chosen point of interest along with the associated dialable telephone number and identifying speaker independent voice model.

8. The apparatus of claim 5 in which the means for displaying identification data is a visual display apparatus visible to an operator of the vehicle and text data is downloaded to the vehicle for display thereby.

9. The apparatus of claim 5 in which the means for displaying identification data is an audible display apparatus provided with voice generation capability and a voice generation data is downloaded to the vehicle for display thereby.

10. Apparatus for providing mobile application services to a subscriber in a vehicle comprising, in combination:

a service center having a telecommunication apparatus connected to a public switched telephone network and an electronic database containing a data structure associating each of a plurality of points of interest with an identifying speaker independent voice model and a dialable telephone number;

a wireless telecommunication apparatus in the vehicle for communication over a wireless network to the public switched telephone network, the wireless telecommunication apparatus comprising a microphone, a speaker, means for receiving and storing at least one of the identifying speaker independent voice models and its associated dialable telephone number, and means responsive to spoken data matching the stored associated identifying speaker independent voice model for performing automated dialing of the stored dialable telephone number associated therewith;

means at the service center for downloading the associated dialable telephone number and identifying speaker independent voice model of a subscriber chosen point of interest to the data storage means in the vehicle through the public switched telephone network, the wireless network and the wireless telecommunication apparatus in the vehicle, wherein automated dialing thereof may be activated in the vehicle by the subscriber speaking data matching the associated identifying speaker independent voice model.

11. Apparatus for providing mobile application services to a plurality of subscribers in a plurality of vehicles comprising in combination:

a service center having a telecommunication apparatus connected to a public switched telephone network and an electronic database containing a data structure associating each of a plurality of points of interest with a dialable telephone number and an identifying speaker independent voice model;

a wireless telecommunication apparatus in each of the vehicles for communication over a wireless network to the public switched telephone network, each wireless telecommunication apparatus having data storage means for storing a received dialable telephone number and identifying speaker independent voice model and further means responsive to spoken data matching the identifying speaker independent voice model for automated dialing of the associated dialable telephone number; and means for selecting a point of interest in the electronic database and downloading the associated dialable telephone number and identifying speaker independent voice model of the chosen point of interest selectively to the storage means in any one of the vehicles through the public switched telephone network, the wireless network and the wireless telecommunication apparatus in the selected vehicle, wherein automated dialing thereof may be activated in the vehicle.

12. A method of providing mobile application services to a subscriber comprising:

providing a service center having a telecommunication apparatus coupled to a network and an electronic database containing a plurality of speaker independent voice models;

providing a wireless telecommunication apparatus for communication over the network;

downloading at least one speaker independent voice model to the wireless telecommunications apparatus over the network; and dialing the wireless telecommunication apparatus in response to a spoken command matching the downloaded speaker independent voice model.

* * * * *